Oct. 12, 1948.   V. R. HOLMGREN   2,451,219
DYNAMOELECTRIC MACHINE
Filed May 28, 1947   2 Sheets-Sheet 1

Inventor:
Viking R. Holmgren,
by Prowell S. Mack
His Attorney.

Oct. 12, 1948. V. R. HOLMGREN 2,451,219
DYNAMOELECTRIC MACHINE

Filed May 28, 1947 2 Sheets-Sheet 2

Inventor:
Viking R. Holmgren,
by Prowell P. Mack
His Attorney.

Patented Oct. 12, 1948

2,451,219

UNITED STATES PATENT OFFICE 2,451,219

DYNAMOELECTRIC MACHINE

Viking R. Holmgren, Lynn, Mass., assignor to General Electric Company, a corporation of New York Application May 28, 1947, Serial No. 750,908

5 Claims. (Cl. 171—252)

1

My invention relates to improvements in dynamoelectric machines and, more specifically, to constructions for improving the ventilation of such machines.

When forced cooling is used to achieve ventilation within a dynamoelectric machine, such as by using one or more fans or impellers to forcefully circulate a gaseous coolant therein, it is usually found that turbulence and other factors form not only high but low pressure spots within the machine. Such low pressure spots cause a tendency to draw in, from the outside atmosphere, air containing dirt, oil, water or other foreign elements damaging to the machine's component parts. The situation is aggravated in machines of large size as in such machines there is a strong tendency for air to leak around the shafting, around power and heater leads, around cleanout plates and port holes, and through the housing joints. It is pretty generally known that during normal operation of conventional large dynamoelectric machines, air leaks into and out of the frame bringing in a small amount of dirt each day, most of which accumulates within the machine. It is considered impossible to make the frames of such large machines air-tight without incurring excessive costs.

It is an object of my invention to provide simple and inexpensive means for overcoming this difficulty.

Broadly, the means employed in the embodiments herein described and illustrated consists of a novel arrangement which assures that above atmospheric pressures will be provided at critical leakage points to atmosphere within the machine, thus assuring that no room air and associated dirt, moisture, corrosive fumes or other undesirable elements will infiltrate.

Further objects and advantages of my invention will becomes apparent and my invention will be better understood from consideration of the following description taken in connection with the accompanying drawing.

Figure 1:
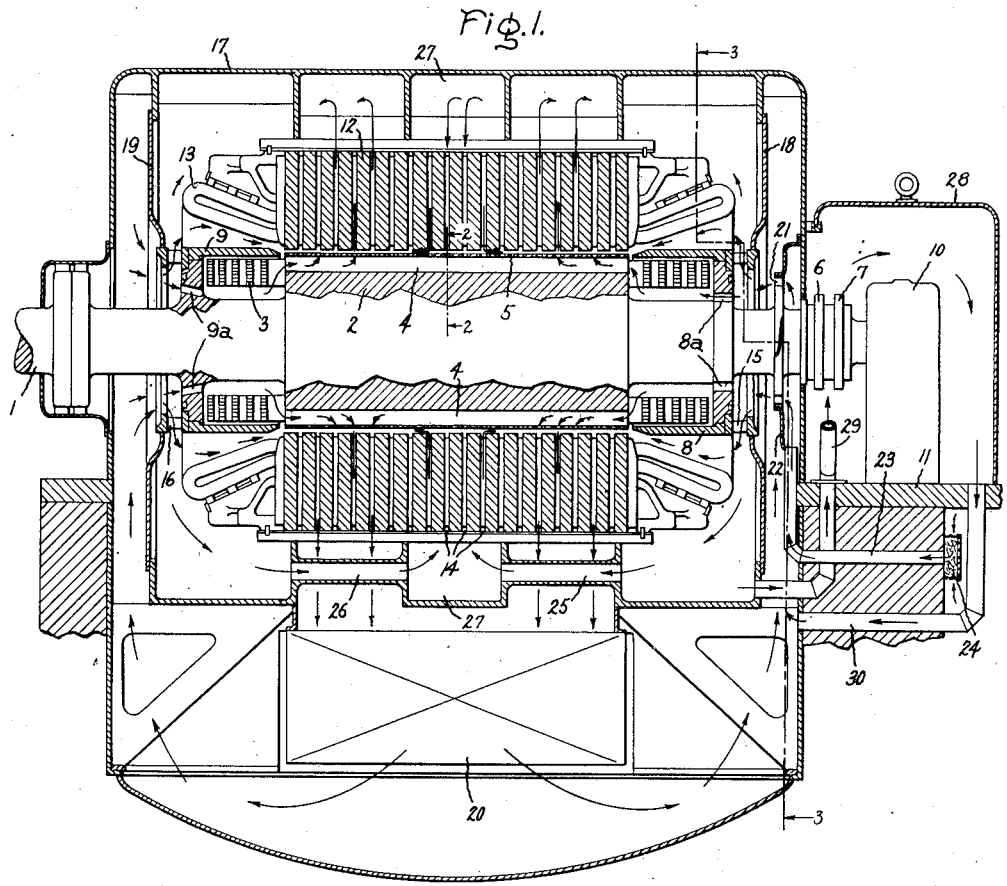
Figure 2:
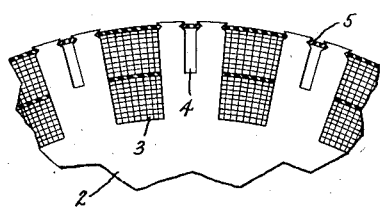
Figure 3:
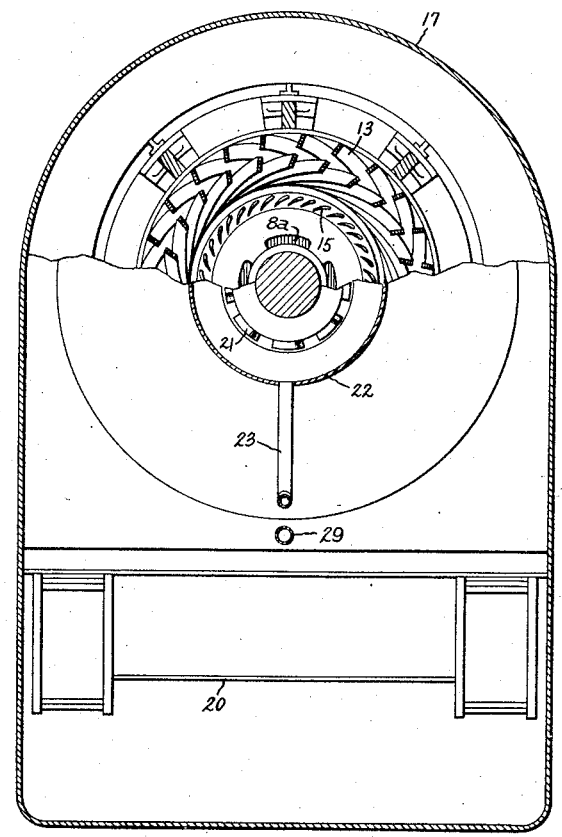

In the drawing, Fig. 1 is a side elevational view, in section, of a dynamoelectric machine suitably embodying my invention and including a rotor; Fig. 2 is a cross-sectional view taken on the line 2—2 of Fig. 1 and showing an enlarged portion of said rotor; and Fig. 3 is a cross-sectional view taken on line 3—3 of Fig. 1.

Referring to the drawing, I have shown in Fig. 1 my invention in connection with a high speed turbine generator. The machine is adapted to be driven through shaft 1 by a high speed steam turbine (not shown). Solidly coupled to shaft 1 is a rotatable member 2 which includes a magnetic core member provided with slots for a rotor winding 3. Rotor 2 is also provided with ventilating passages or cooling ducts 4 which extend in an axial direction and which at their outer radial extremities are covered with barriers 5 perforated at longitudinally-spaced intervals to allow passage of cooling medium.

Rotor winding 3 is energized through slip rings 6 and 7, in the conventional manner, so that the rotor provides a rotating field. The end turns of winding 3 are retained in position by the retaining end rings 8 and 9 arranged about the end turns at each end of the rotatable member and adapted to rotate therewith. Said rings are provided with openings 8a and 9a allowing the introduction of cooling medium to the winding end turns.

Rotor 2 is rotatably mounted in bearings, at least one of which is located in bearing pedestal 10 resting upon support plate 11.

Rotor 2 is arranged to excite a stationary magnetic core member, stator 12, which is provided with axially extending slots (not shown) for armature winding 13 and with radially extending ventilating passages or cooling ducts 14, which are disposed across the air gap from the perforations in barriers 5.

In order to circulate ventilating medium through the machine, the main ventilating medium impellers 15 and 16 are arranged at each end of the machine. These bladed impellers are attached to retaining end rings 8 and 9 so as to rotate with rotor 2.

A housing 17 is provided to cover substantially the entire machine and it includes stationary inner air shields 18 and 19 adapted to guide ventilating medium to the intake side of impellers 15 and 16 and from the exhaust side of said impellers to the interior of the machine. The machine is provided with a cooler 20 through which the ventilating medium is forced. Conventional means such as a plurality of water circulating pipes (not shown) are provided in said cooler to assure cooling of the ventilating medium therein. Thus far the arrangement is purely conventional.

I also provide another impeller rotatable with rotor 2 which is the relatively small bladed auxiliary impeller 21 adapted to provide at the intake side of impeller 15 a pressure which is positive with respect to that of the outside atmosphere.

Since a positive pressure is thereby provided at the input side of the main impeller, there is an even more positive pressure on the output side of said main impeller. The units are so selected that thereby is provided means for assuring at all points in the output side of the main impeller a pressure which is sufficiently positive with respect to that of the outside atmosphere that there will be no inward leakage despite the effect of localized turbulence or injector actions.

A stationary air shield 22 is provided to direct ventilating medium into auxiliary impeller 21. In the embodiments herein described and illustrated the ventilating medium is air, and auxiliary impeller 21 derives its supply from the outside atmosphere through the duct 23. A clean supply of air is assured by the use of a replaceable filter 24 at the intake of duct 23. Auxiliary impeller 21, which is used only to supply relatively small amounts of "make-up" air, may be made small compared to the main impellers.

Fig. 1 may be more readily understood by reference to Fig. 2 and Fig. 3. Fig. 2, showing an enlarged portion of rotor 2, shows said rotor slotted to receive rotor winding 3 and provided with ventilating ducts 4 having perforated barriers 5.

Fig. 3, a view partly in cross section and taken on the line 3—3 of Fig. 1, shows housing 17 surrounding the entire machine, a cross section of the end turns of stator or armature winding 13, the individual blades of the main impeller 15, and openings 8a provided in the centering ring portion of the retaining end ring 8 as shown in Fig. 1. Fig. 3 also shows the individual blades of auxiliary impeller 21, auxiliary impeller stationary air shield 22, duct 23, duct 29 (the function of which is described later) and cooler 20.

As indicated by the arrows in Fig. 1, ventilating medium passes through the filter 24, through duct 23, through auxiliary impeller 21, through main impeller 15, around the retaining end ring 8, into the air gap, then outwardly through certain of stator ducts 14 and from there it goes around the outside periphery of the machine within the housing 17, through cooler 20 and then back to the main impellers 15 and 16 located at each end of the machine. A parallel path is provided through openings 8a and 9a in the centering rings of the retaining end rings 8 and 9 to the rotor ducts 4 then through the perforations in barriers 5, across the air gap and then into certain stator ducts 14. Additional parallel paths are furnished from the output side of each main impeller through the bottom ducts 25 and 26 to central outer duct 27 which surrounds the stator. From duct 27 the ventilating medium passes radially inward through those of the stator ducts 14 which are disposed thereunder, then into air gap and from the air gap radially outward through other stator ducts 14, then to the cooler 20 and finally back to the main impellers 15 and 16.

But while such various parallel paths are provided within the machine, it should be observed that the action of the auxiliary impeller 21 is always in series, so to speak, with that of the conventional main impellers 15 and 16.

The area immediately in front of the shaft-mounted auxiliary impeller 21 (i. e. to the right of the impeller in Fig. 1) will be at below atmospheric pressure. This is due to the drop from atmosphere through supply duct 23 and filter 24, plus some additional drop in front of the auxiliary impeller blades due to acceleration of air as it enters the impeller. To prevent room air from leaking in at this point, the area is completely surrounded by chambers having above-atmospheric pressure.

In order thus to prevent any leakage of air into the chamber at the intake side of auxiliary impeller 21, and also to provide a clean supply of air to slip rings 6 and 7 and to the bearing located within pedestal 10, the added enclosure 28 is provided at this end of the machine and interconnected by duct 29 with a point of high pressure. A duct 30 is optionally provided to assure circulation of air within housing 28. It should be noted that the discharge of duct 30 is still at a pressure greater than that of the outside atmosphere because it is on the discharge side of impeller 21. If desired, a generator exciter (not shown) may also be inclosed in the same housing 28 enclosing slip rings 6 and 7 and pedestal 9. Optionally the whole arrangement of auxiliary impeller, added end enclosure and cooperating ducts may be duplicated at the other end of the machine.

While it would be possible to use an external fan connected through duct work to furnish make-up air to the machine and assure positive pressure at all points therein, such an arrangement is less dependable than the embodiment shown in Fig. 1 since such an auxiliary external fan might stop and the main machine continue to operate, sucking in dirt-laden air. The embodiment shown by Fig. 1 has the added advantage that, since there is no external duct work, the fit of all the parts will be entirely within the control of the manufacturer designing and fabricating the machine, rather than within the control of those doing the final installation work.

It should be noted that in any event the make-up fan (such as 21 of Fig. 1) supplies make-up air to the intake side of one of the main circulating impellers. This is a preferred arrangement for if the make-up air were introduced anywhere else in the ventilating system the make-up impeller would have to be of larger capacity as it would have to operate at higher output pressure.

It will be observed that with the embodiment illustrated, a positive pressure is assured at all leakage points throughout the machine so that any leakage which may occur, such as around the end of the shaft which connects with the driving turbine, will be in an outwardly direction. Thus, it is assured that the air within the machine is clean and free of such impurities as moisture, oil, dirt and grit which would be damaging to coil windings and other parts of the generator.

Thus there is provided a device of the character described which, by assuring that a small amount of clean air will leak out, assures that the machine will operate free of impurities. This has an added advantage in that the end turns of the rotor and stator windings may be designed with less insulation, with a consequent reduction in heating of the windings.

While I have illustrated and described particular embodiments of my invention, modifications thereof will occur to those skilled in the art. I desire it to be understood, therefore, that my invention is not to be limited to the particular arrangements disclosed, and I intend in the appended claims, to cover all modifications which do not depart from the spirit and scope of my invention.

What I claim as new and desire to secure by Letters Patent of the United States is:

1. A dynamoelectric machine having a stationary member, a rotatable member, ventilating passages through at least one of said members, a housing inclosing said machine, a main impeller rotatable with said rotatable member for circulating ventilating medium through said ventilating passages, an air shield located within said housing near one end thereof to guide ventilating medium to the intake side of said main impeller, and an auxiliary impeller rotatable with said rotatable member for providing at the intake side of said main impeller and said air shield a pressure greater than that of the atmosphere surrounding said machine.

2. A dynamoelectric machine having a stationary member, a rotatable member, ventilating passages through said members, a housing inclosing said machine, means including at least one main impeller rotatable with said rotatable member for circulating ventilating medium through said ventilating passages, at least one air shield located within said housing and near one end thereof and adapted to guide ventilating medium to the intake side of said main impeller, means including an auxiliary impeller rotatable with said rotatable member and for providing a positive pressure at the intake of said first mentioned impeller, and means including a filter and at least one duct passage for assuring a clean supply of ventilating medium to said positive pressure providing means.

3. A dynamoelectric machine having a stationary member, a rotatable member, ventilating passages through at least one of said members, a housing inclosing substantially all of said machine, at least one main ventilating medium circulating impeller located within said housing, an air shield located within said housing and adapted to guide ventilating medium to the intake side of said main impeller, an auxiliary impeller rotatable with said rotatable member and adapted to provide at its output side and at the intake side of the main impeller a pressure which is positive with respect to that of the atmosphere outside the main housing, means including a duct passage and filter for supplying at the intake side of said auxiliary impeller clean ventilating medium, collector rings rotatable with said rotatable member and located outside of said main housing and at the end of said machine nearest said auxiliary impeller, a collector housing arranged to completely inclose all leakage points adjacent the input side of said auxiliary impeller, and a duct supplying positive pressure to said collector housing from the output side of said main impeller.

4. A dynamoelectric machine having a stationary member, a rotatable member, ventilating passages through both of said members, a housing inclosing substantially all of said machine, at least one main impeller rotatable with said rotatable member and for circulating ventilating medium through said ventilating passages, at least one air shield located within said housing and near one end thereof and for guiding ventilating medium to the intake side of said main impeller, means including an auxiliary impeller rotatable with said rotatable member and adapted to provide in proximity to said air shield and at the intake side of said main impeller a pressure positive with respect to that of the outside atmosphere, means including an auxiliary air shield and at least one duct for guiding ventilating medium to the intake side of said main impeller, means including a filter for assuring cleanliness of ventilating medium supplied to said auxiliary impeller, collector rings rotatable with said rotatable member and located outside of said main housing and at the end of said machine adjacent the space formed by said auxiliary air shield at the intake side of said auxiliary impeller, a housing for said collector rings, a duct arranged to provide positive pressure from the output side of said main impeller to said collector housing, and an additional duct arranged to provide for the return of ventilating medium from said collector housing to a point between the output of said auxiliary impeller and the input of said main impeller.

5. A dynamoelectric machine having a stationary member, a rotatable member, ventilating passages through at least one of said members, a housing inclosing substantially all of said machine, a main ventilating medium circulating impeller located within said housing at one end thereof and rotatable with said rotatable member, an auxiliary impeller rotatable with said rotatable member and adapted to provide at its output side and at the intake side of said main impeller a pressure which is positive with respect to that of the atmosphere outside the main housing, means for supplying at the intake side of said auxiliary impeller clean ventilating medium, an auxiliary housing inclosing all leakage points adjacent the intake side of said auxiliary impeller, and a duct supplying positive pressure to said collector housing from the output side of said main impeller.

VIKING R. HOLMGREN.

REFERENCES CITED

The following references are of record in the file of this patent:

UNITED STATES PATENTS

| Number | Name | Date |
|---|---|---|
| 1,778,834 | Penney | Oct. 21, 1930 |
| 1,816,489 | Kuyser | July 28, 1931 |
| 1,883,912 | Henningsen | Oct. 25, 1932 |

FOREIGN PATENTS

| Number | Country | Date |
|---|---|---|
| 163,079 | Great Britain | May 9, 1921 |